(12) United States Patent
Cheng et al.

(10) Patent No.: US 6,639,632 B2
(45) Date of Patent: Oct. 28, 2003

(54) BACKLIGHT MODULE OF LIQUID CRYSTAL DISPLAY

(75) Inventors: Huang-Chung Cheng, 2F, No. 14, Alley 2, Lane 86, Chien-Kung I Rd., Hsinchu (TW); Fu-Guo Tarntair, Taipai (TW); Edward Lu, Hsinchu (TW)

(73) Assignee: Huang-Chung Cheng, Hsinchu (TW)

( * ) Notice: Subject to any disclaimer, the term of this patent is extended or adjusted under 35 U.S.C. 154(b) by 131 days.

(21) Appl. No.: 09/911,417

(22) Filed: Jul. 25, 2001

(65) Prior Publication Data
US 2003/0025851 A1 Feb. 6, 2003

(51) Int. Cl.$^7$ .............................................. G02F 1/1335
(52) U.S. Cl. ....................................................... 349/12
(58) Field of Search .......................... 345/173; 349/141, 349/152, 15; 438/30

(56) References Cited

U.S. PATENT DOCUMENTS 6,355,420 B1 * 3/2002 Chan .............................. 435/6
6,456,279 B1 * 9/2002 Kubo ........................ 345/173

* cited by examiner

*Primary Examiner*—John F. Niebling
*Assistant Examiner*—Andre' C. Stevenson
(74) *Attorney, Agent, or Firm*—Rosenberg, Klein & Lee

(57) ABSTRACT

The present invention provides a backlight module of a liquid crystal display (LCD), wherein a field emitting display is disposed at a backlight position of a liquid crystal panel module to be used as a backlight module of the display for providing the required backlight source. The field emitting display is composed of a plurality of carbon nanotubes to have a low operational voltage. The present invention has the characteristics of high brightness, power saving, super thinness, and capability of being used in rigorous environments.

4 Claims, 1 Drawing Sheet

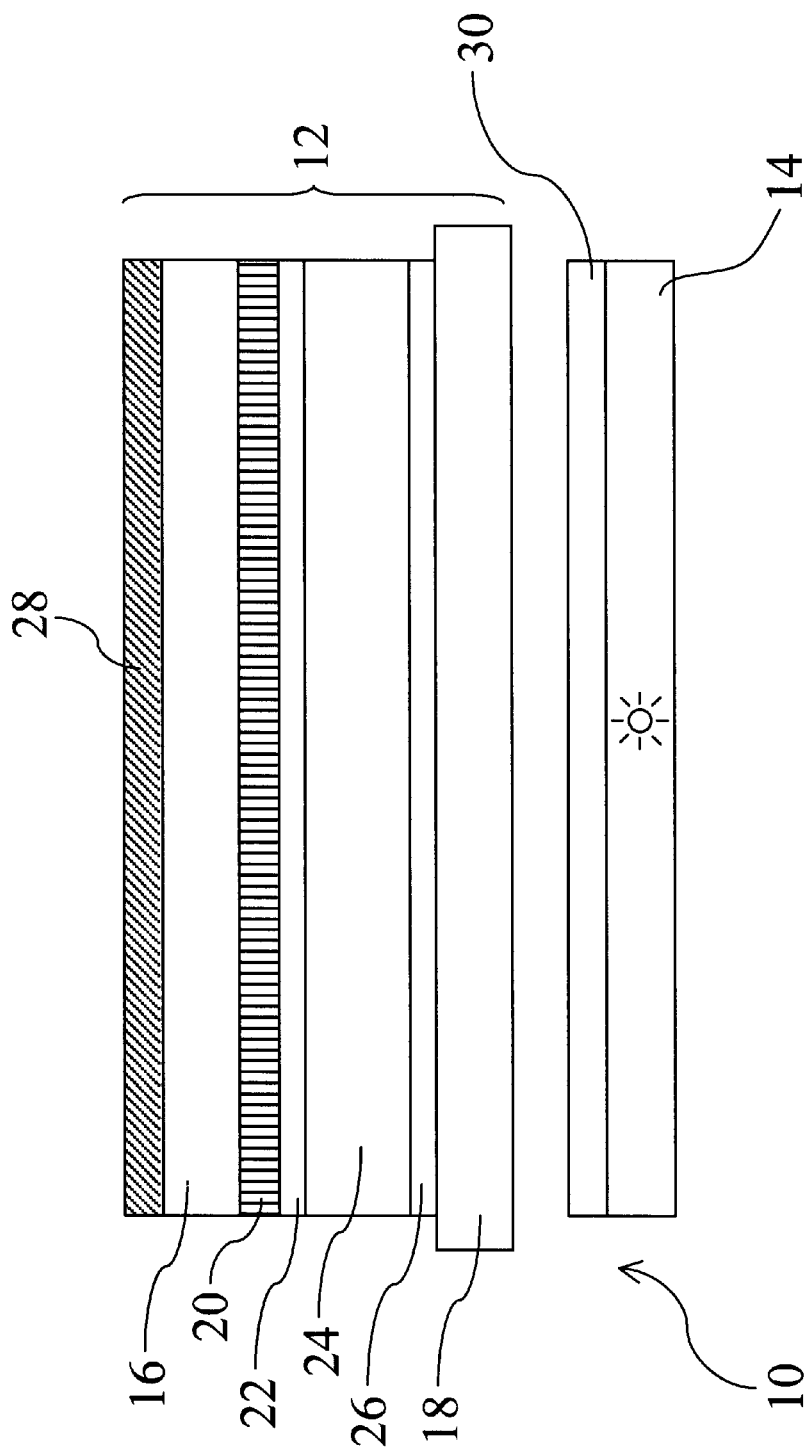

BACKLIGHT MODULE OF LIQUID CRYSTAL DISPLAY

FIELD OF THE INVENTION

The present invention relates to a backlight module of a liquid crystal display (LCD) and, more particularly, to a filed emitting/emission display (FED) device, such as one having a plurality of carbon nanotubes, incorporated into a backlight module of an LCD.

BACKGROUND OF THE INVENTION

Displays are the most direct sensory interfaces between humans and televisions and between humans and electronic/information products. The quality of a display directly influences the visual feel of the user or even the emotion of the user. Therefore, there are more and more efforts devoted to researches relevant to displays. The research points of emphasis focus on how to switch from monochromatic, low-resolution, bulky, highly power-dissipating, small area displays to color, high-resolution, compact, lowly power-dissipating, large area displays. Because LCDs have the characteristics of thin shape, light weight, low power dissipation, they have been widely used as large displays such as screens of desktop computers and small displays such as portable information terminals. The rate of usage of LCDs gradually increases.

In an LCD, the characteristics of electrical induction and optical anisotropy of liquid crystal material are exploited. The liquid crystal material has good molecular orientation and fluidity characteristics. When the liquid crystal material is subject to external excitations such as illumination, heat, electrical field, and magnetic field, its molecular orientation will easily be altered so that brightness contrast will change or other special electrical and optical effects will emerge when light penetrates through it. However, an LCD is not a self-luminescent display. Therefore, a backlight module is required to achieve the object of displaying. For the present middle-size LCDs, cold cathode fluorescent lamps (CCFLs) are used as the light sources. Although CCFLs have good displaying effect in terms of uniformity and brightness, power supplies of high voltage (~800 V) are required. This is a detrimental drawback to portable displays. Additionally, the characteristics of a CCFL will be affected by temperature to greatly decrease its lifespan so that an LCD cannot be used in rigorous regions such as deserts, snowing regions, and so on. Moreover, using a CCFL as a backlight module of an LCD will result in a higher cost.

A field emitting display (FED) is a kind of high-quality flat display. It is the only one super-thin flat display comparable to the CRT in terms of quality of image. An FED has the advantages of high brightness and high resolution. However, it still requires a higher driving voltage. In order to let field emitting arrays be practical, the development of field emitting cathodes must tend toward low operational voltage and high efficiency. Recently, a kind of compound made mainly of carbon has been developed. This kind of compound made mainly of carbon is carbon nanotube. The carbon nanotubes can greatly reduce the required operational voltage of an FED, and has good characteristics of field-emitted current and good mechanical properties. The carbon nanotubes thus have the potential of becoming high-performance field emitting electrodes.

The present invention aims to propose the design of using an FED as a backlight source of an LCD to effectively solve the above problems in the prior art.

SUMMARY OF THE INVENTION

The primary object of the present invention is to provide an FED made of carbon nanotubes as a backlight module of an LCD for providing the required light source for the display. The present invention has a rather low operational voltage to overcome the drawback of requiring a high operational voltage for a prior art CCFL LCD.

Another object of the present invention is to provide an FED having the characteristics of high brightness, power saving, and super thinness so that it can be used in rigorous environments and will not be limited by temperature.

To achieve the above objects, in the present invention, an FED having carbon nanotubes is disposed at a backlight position of a liquid crystal panel module of an LCD to be used as a backlight module and to replace the prior art CCFL.

The various objects and advantages of the present invention will be more readily understood from the following detailed description when read in conjunction with the appended drawings, in which:

BRIEF DESCRIPTION OF THE DRAWINGS

FIG. 1 is a structure diagram of the present invention.

DETAILED DESCRIPTION OF THE PREFERRED EMBODIMENTS

Because the carbon nanotubes have very high field-emitted currents and very low threshold voltages, they are very potential in the applications of vacuum microelectronics, especially in the application of FEDs. The present invention is characterized mainly in that an FED made of carbon nanotubes is used as a backlight module of an LCD.

As shown in FIG. 1, an LCD 10 comprises a liquid crystal panel module 12 and an FED 14 used as a backlight module. The liquid crystal panel module 12 comprises an upper transparent substrate 16 and a lower transparent substrate 18, generally being made of glass material or other transparent materials. The upper and lower transparent substrates 16 and 18 are parallel spaced and have opposed surfaces. A color filter 20, an upper electrode layer 22, a liquid crystal layer 24, and a lower electrode layer 26 are sandwiched from top to bottom in this order between the opposed surfaces of the upper and lower transparent substrates 16 and 18. The upper and lower electrode layers 22 and 26 are transparent electrode layers of indio tin oxide (ITO). A polarizer 28 covers on the outer surface of the upper transparent substrate 16. The FED 14 is disposed at a backlight position of the lower transparent substrate 18 of the liquid crystal panel module 12 to be used as a backlight module for providing the required backlight source. To let the backlight emitted by the FED 14 be uniformly diffused to the liquid crystal panel module 12, a diffuser 30 is disposed between the lower transparent substrate 18 of the liquid crystal panel module 12 and the FED 14.

The FED 14 is composed of a plurality of carbon nanotubes. The carbon nanotubes can emit electrons at a low operational voltage to let a fluorescent layer emit light, thereby providing the required backlight source for an LCD. The chemical vapor deposition (CVD) method is mainly used to form carbon nanotubes. The present invention thus uses the CVD system to form carbon nanotubes. The carbon nanotubes has an important characteristic of growth, i.e., they can be selectively grown on a metal catalytic layer. The pattern of the required field emitting array can be formed using only the lift-off process of photo resist. The whole process is very simple and applicable to the fabrication of large-scaled devices.

To prove that an FED is better used as a backlight module of an LCD than used as an information display, the range of applications of an FED is summarized in Table 1.

TABLE 1

|  | Information display | Backlight source of LCD |
| --- | --- | --- |
| Large area panel | Required | Not required |
| Patterning of anode fluorescent panel | Required | Not required |
| Spacer | Required | Not required |
| High brightness | Yes | Yes |
| Driving circuit | Complex | Simple |

As can be known from Table 1, using an FED as a backlight source of an LCD has many advantages in fabrication. Additionally, using an FED of carbon nanotubes to replace a prior art CCFL as a backlight source of an LCD has better effects, as shown in Table 2.

TABLE 2

|  | CCFL | FED of carbon nanotubes |
| --- | --- | --- |
| Operational voltage | >800 V (more power-consuming) | <500 V (more power-saving) |
| Weight | Heavier | Lighter |
| Volume | Thicker | Thinner |
| Lifespan | Greatly diminished at low or high temperatures | Immune to temperature |

To sum up, the present invention exploits the liquid crystal panel technique matched by an FED of simple fabrication process. The present invention uses an FED of carbon nanotubes as a backlight module of an LCD to have a very low operational voltage, hence effectively solving the drawback of requiring a high operational voltage for the prior art CCFL LCD. Moreover, the present invention is immune to temperature change so that an LCD can be used in rigorous regions such as deserts, snowing regions, and so on. Therefore, the present invention has the characteristics of high brightness, power saving, super thinness, long lifespan, and simple fabrication process.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A liquid crystal display comprising:

a liquid crystal panel module including first and second transparent substrates, said liquid crystal panel module further including a color filter, an upper electrode layer, a liquid crystal layer, and a lower electrode layer sandwiched between said first and second transparent substrates, and a polarizer disposed on an outer surface of at least one of said first and second transparent substrates, said first and second transparent substrates respectively defining for said liquid crystal panel module front and back sides; and, a backlight module disposed adjacent said back side of said liquid crystal panel module, said backlight module including an FED field emission display device for backlighting said liquid crystal panel module.

2. The liquid crystal display as claimed in claim 1, wherein said transparent substrates are glass substrates.

3. The liquid crystal display as claimed in claim 1, wherein said FED field emission display device includes a plurality of carbon nanotubes.

4. The liquid crystal display as claimed in claim 1, wherein a diffuser is further disposed between said back side of said liquid crystal panel module and said FED field emission display device.

* * * * *